D. E. NEWCOMB.
NUT LOCK.
APPLICATION FILED AUG. 25, 1916.
1,238,933.
Patented Sept. 4, 1917.
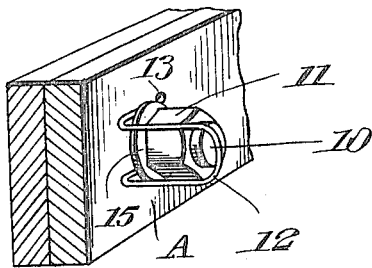
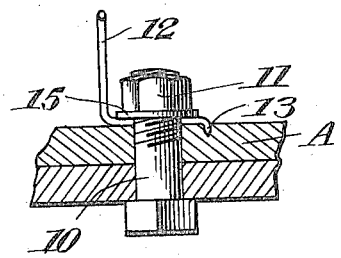
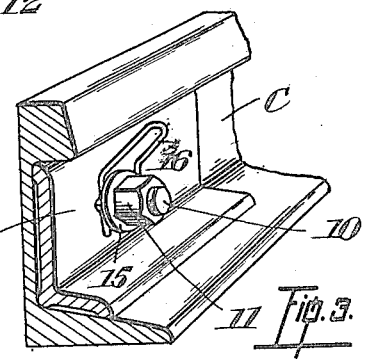
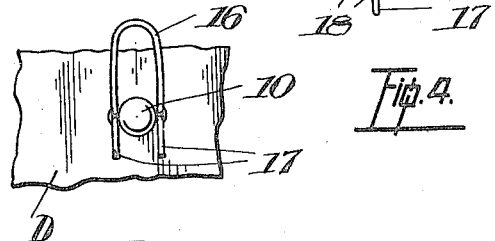
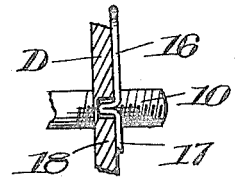
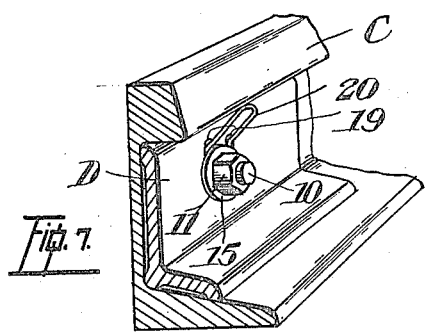
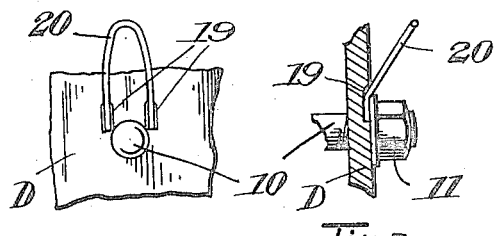
WITNESSES
INVENTOR
D. E. NEWCOMB
BY Featherstonhaugh & Co.
ATT'YS.

UNITED STATES PATENT OFFICE.

DELANCY ELWOOD NEWCOMB, OF SYDNEY, NOVA SCOTIA, CANADA.

NUT-LOCK.

1,238,933.     Specification of Letters Patent.     Patented Sept. 4, 1917.

Application filed August 25, 1916. Serial No. 116,925.

*To all whom it may concern:*

Be it known that I, DELANCY ELWOOD NEWCOMB, a subject of the King of Great Britain, and resident of Sydney, in the Province of Nova Scotia, Dominion of Canada, have invented certain new and useful Improvements in Nut-Locks, of which the following is the specification.

This invention relates to nut locks and the objects of the invention are to facilitate in rigidly securing the nut in position without the liability of the same becoming inadvertently loosened by jarring and the like, to simplify the construction and cheapen the cost of manufacture and other objects which will be made clear hereafter and it consists essentially of the improved construction particularly described and set forth in the following specification and accompanying drawings forming part of the same.

In the drawings.

Figure 1 is a perspective view of a bolt and nut embodying the present invention.

Fig. 2 is a side elevation, partly sectional, of the same.

Fig. 3 is a perspective view of the nut lock applied to a rail joint.

Fig. 4 is a perspective view of the nut lock shown in Fig. 3.

Fig. 5 is a plan view of the nut lock shown in Fig. 3.

Fig. 6 is a side elevation, partly sectional, of the bolt and nut lock.

Fig. 7 is a perspective view of an alternative form of nut lock applied to a rail joint.

Fig. 8 is a plan view of the nut lock.

Fig. 9 is a side elevation, partly sectional, of the improved nut lock.

Like characters of reference refer to like parts in the several drawings.

Referring to the drawings, A represents a pair of beams of any type secured together by the bolt 10 and nut 11 held in locked engagement by the resilient wire 12 bent in a substantial U shape and having its free parallel ends bent at right angles thereto, the said free ends being provided with offset points 13 adapted to engage one of the said beams. The parallel ends of the wire are designed to embrace the bolt 10 and are frictionally engaged by the superimposed washer 15 carried by the bolt.

When the nut 11 is screwed on the bolt to the desired tension the U-shaped wire 12 is bent over to interlock, and thereby prevent the same being inadvertently disengaged from the bolt.

In Figs. 3 to 6 the nut lock is adapted for use with a railway joint C and to this end the wire 16 is bent in a substantial U-shape and is further provided with offset portions 18 intermediate of the length of the free parallel arms 17, the said offset portions being adapted to be located in the bolt hole through the fish plate D in which position the parallel arms 17 of the wire embrace the bolt 10, the offset portions 18 being located on diametrically opposite sides thereof. The washer 15 is placed in position and the nut 11 screwed on the bolt when the wire is bent over to engage the nut, securely locking the same in position.

In Figs. 7 to 9 a modified form of nut lock is shown applied to a rail joint C in which the fish plate D is provided with grooves 19 located adjacent to the bolt hole and on diametrically opposite sides thereof. The wire 20 is bent in substantially U-shape and its free ends engaged with the grooves 19 whereupon the washer 15 is placed in position and the nut 11 screwed on the bolt.

When the nut is tightened to the desired extent the washer 15 engages the free ends of the wire 20 located in the groove 19 and the U-shaped portion of the wire is then bent over to embrace the nut and secure it in locked engagement with the bolt.

From the above description it will be seen that this nut lock is of the cheapest possible type and can be advantageously employed in railway joints and the like at a minimum of cost.

As many changes could be made in the above description and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

A nut lock of the class described comprising a resilient wire bent in a U-shape having double offset projections in the parallel arms thereof and spaced from the free end, the free ends of the said wire being adapted to embrace the bolt with the said projections located in the bolt hole on diametrically opposite sides of the said bolt, the said U-shaped member being adapted to be bent over to engage the nut, substantially as described.

In witness whereof I have hereunto set my hand in the presence of two witnesses.

DELANCY ELWOOD NEWCOMB.

Witnesses:
JEAN COCHRAN,
JOHN MACNEIL.

Copies of this patent may be obtained for five cents each, by addressing the "Commissioner of Patents, Washington, D. C."